Sept. 25, 1928.  1,685,639
L. LAGALI
INTERNAL COMBUSTION ENGINE
Original Filed Dec. 1, 1922   4 Sheets-Sheet 2
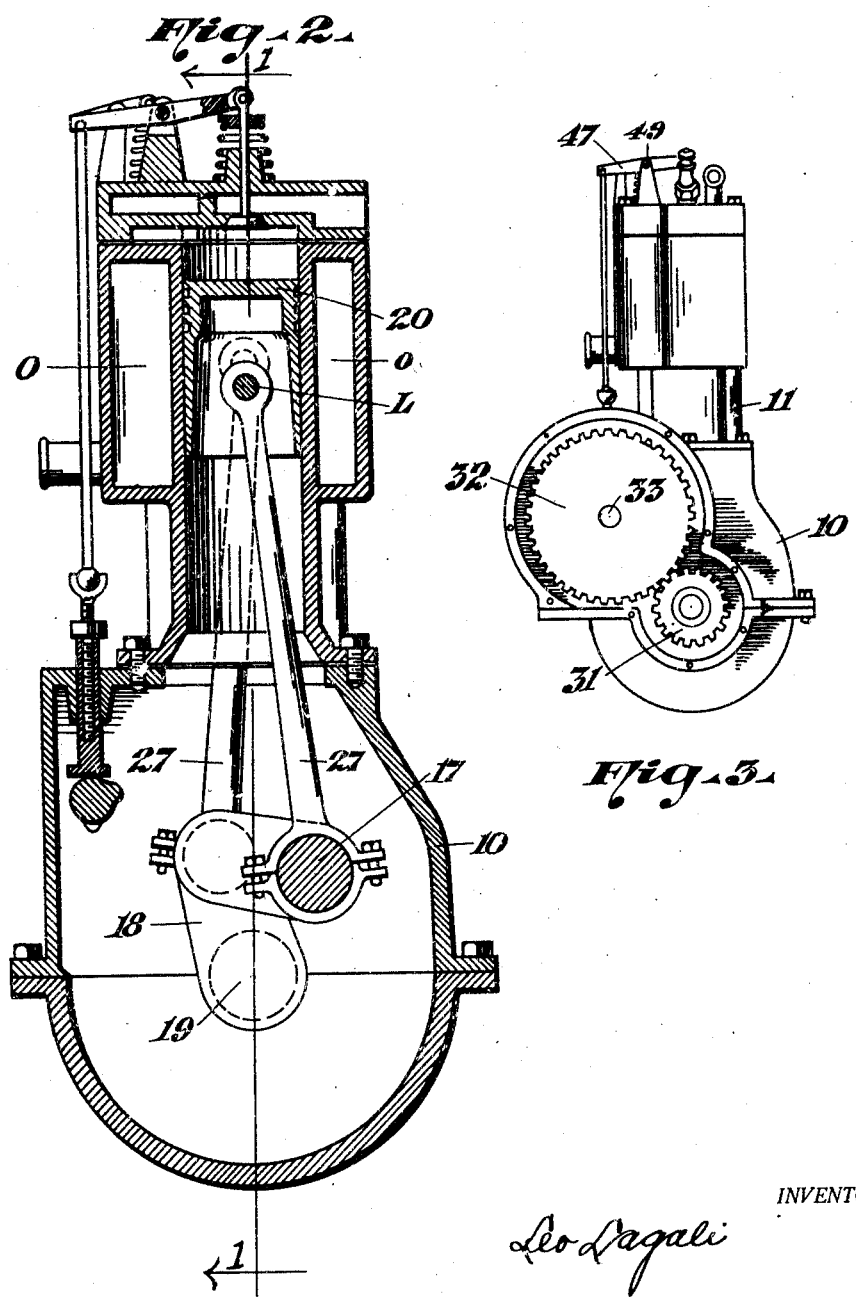
INVENTOR.
Leo Lagali Sept. 25, 1928.
L. LAGALI
1,685,639
INTERNAL COMBUSTION ENGINE
Original Filed Dec. 1, 1922   4 Sheets-Sheet 3
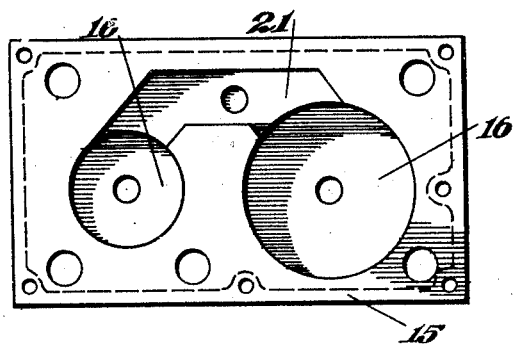
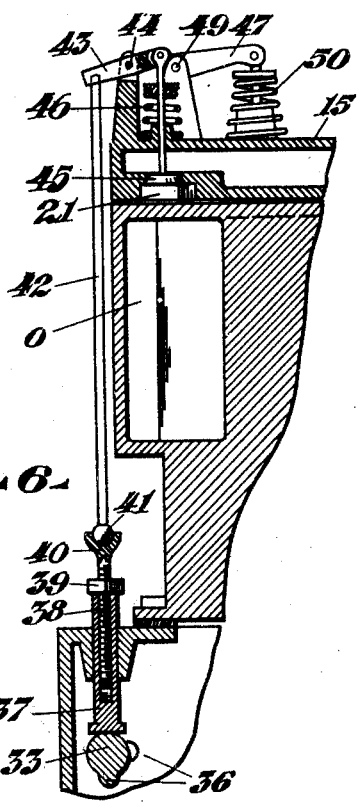
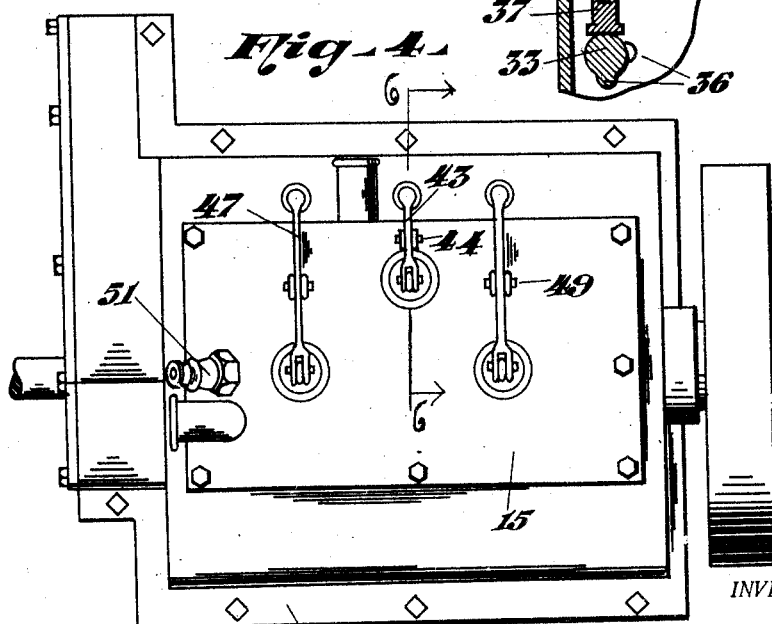
INVENTOR.
Leo Lagali

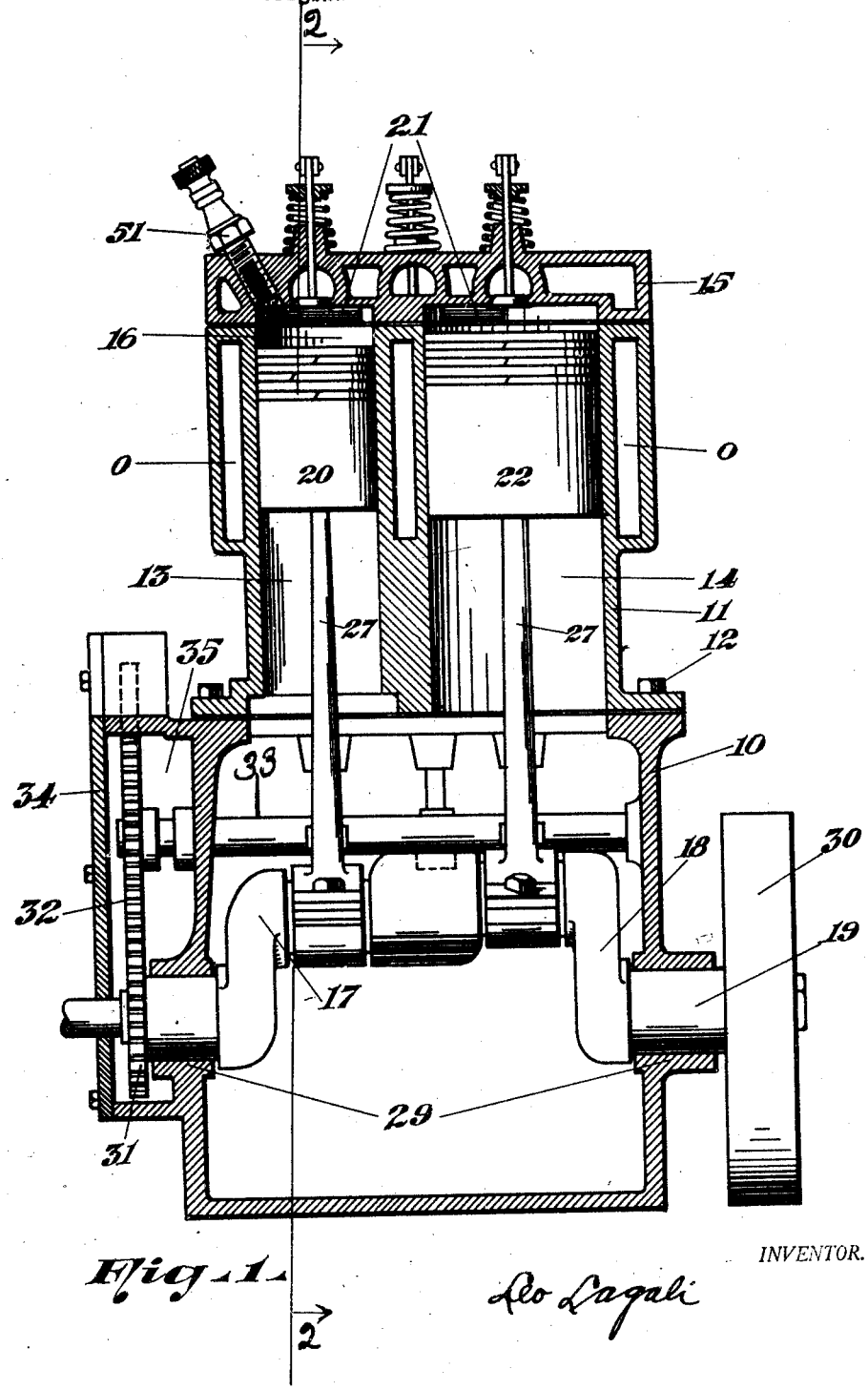

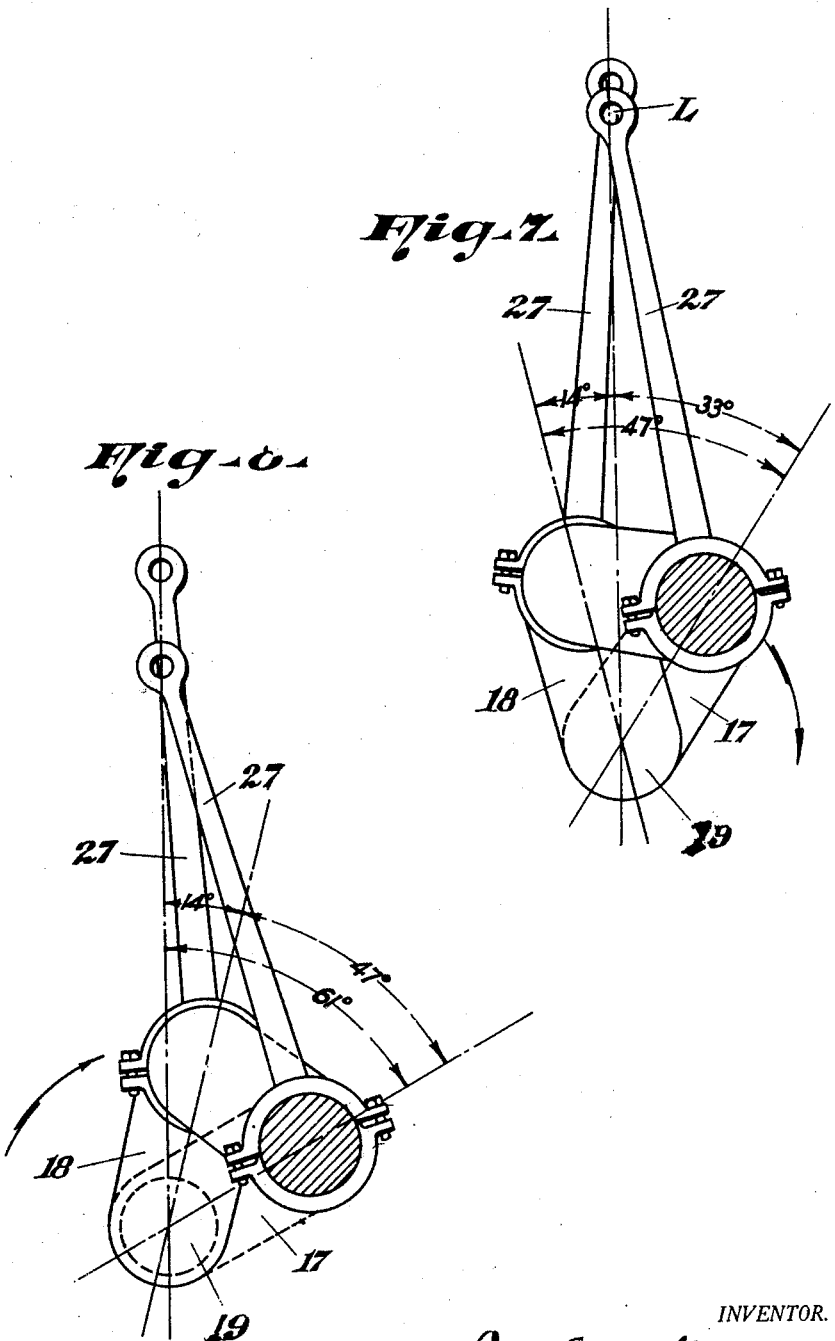

Patented Sept. 25, 1928.

1,685,639

UNITED STATES PATENT OFFICE.

LEO LAGALI, OF EL RENO, OKLAHOMA.

INTERNAL-COMBUSTION ENGINE.

Application filed December 1, 1922, Serial No. 604,385. Renewed August 15, 1928.

My invention relates to improvements in internal combustion engines and may be applied to the two cycle, four cycle or double acting type of explosive engines, although in the accompanying illustrations I have shown it in connection with a four cycle engine.

The object of the invention is to provide an engine in which the explosion and expanding action of an ignited fuel charge in one cylinder of the engine is partly utilized to increase the compression and raise the temperature and more completely vaporize the fuel charge in another cylinder of the engine prior to ignition therein, to provide an engine in units of preferably two cylinders each, of different diameters and with a constantly open passage connecting their combustion chambers, and intercommunicating throughout the cycle of operation.

Another object of the invention is to provide an internal combustion engine, in which a small bore cylinder and large bore cylinder are so connected that part of the compression action caused by the piston in the large cylinder during its compression stroke is utilized to increase the compression of the fuel charge in the small cylinder to a point in excess of that obtained by the piston compression stroke in the small cylinder; and subsequently to further increase the compression in the large cylinder beyond that of its piston compression stroke, by the action of the explosion and expanding action of the ignited fuel charge in the small cylinder through the medium of said passage.

A further object of the invention is to construct an engine in such a manner, that a more uniformly increasing pressure is delivered upon each piston by the explosion and expanding action of the fuel charge in the cylinders; in other words, when the fuel charge is ignited in the small cylinder, only a part of the energy will act upon the piston, as the other part of the energy will be communicated through the medium of said passage into the large cylinder for the purpose of further increasing the pressure of the fuel charge in the large cylinder, which has already been compressed by the compression stroke of the piston in the large cylinder.

This energy communicated through the medium of said passage into the large cylinder is not lost but just stored in the large cylinder by further increasing the pressure and raising the temperature and more completely vaporizing the fuel charge in the large cylinder prior to ignition therein. In this manner the energy that has been stored in the large cylinder by increasing the pressure therein will be returned from three to four times its original pressure when said charge is ignited in the large cylinder by the flame burning through the passage from the small cylinder. The great force from the explosion in the large cylinder is now delivered when the crank arms on the crank shaft stand in a position of greater leverage and more power is delivered to the crank shaft for a turning motion than in the existing type of engine.

In all the cylinders of this engine the highest compression of the fuel charge is obtained at a point past top center, or in other words, during the initial portion of the power stroke in each cylinder, and without the use of any additional operating mechanism for accomplishing such a function.

For this purpose I build the engine in units of preferably two cylinders each, one smaller and one larger in diameter, and having a passage through which the cylinders have communication with each other throughout the cycle of operation, and I space the cranks for the pistons of the cylinders apart, so that the crank of the large cylinder has not yet reached its dead top center while the crank of the smaller cylinder has passed the dead top center about thirty-three degrees when the explosion takes place in the small cylinder. It should now be noted that while the volume of the smaller cylinder, considered singly, was the smallest when its crank passed its dead top center and subsequently would expand during this first thirty-three degrees of the power stroke of said piston, the crank for the larger cylinder was still compressing the fuel in its own cylinder, and as the two cylinders communicate with each other all the time through the medium of said passage the compression in the large cylinder will cause the fuel in the small cylinder to be still more compressed than when the crank was at its dead top center: When the ignition takes place in the small cylinder, part of the pressure from the resulting explosion is transmitted through the medium of said passage to not only retain the high compression in the large cylinder, but actually increase the compression therein until the crank for that cylinder has passed the dead top center about fourteen degrees. When the ignited charge in the small cylinder has burned through said passage and reached the large cylinder, the fuel charge in the large cylinder is exploded, acting upon the pistons of both cylinders. It should now be noted that the pressure upon the small piston was continually increasing by the charge burning through the connecting passage on its way to the large cylinder, and when the charge in the large cylinder is subsequently exploded a still greater pressure will then be exerted upon both pistons, than that which was exerted at the time of ignition in the small cylinder; as a consequence, the force now delivered upon the cranks by the pistons and the power converted into the turning motion of the crank shaft will be greater, and as the force is delivered when the cranks stand in a more suitable position than is the case in ordinary engines, less strain and wear on the bearings of the engine will occur.

To summarize, the aims of the present invention are: first, to compress the volume of the combustible fuel in one cylinder to a considerably greater extent than that normally attained at the end of the piston compression stroke, this being accomplished by the aid of a second cylinder and piston; second, to ignite the fuel in this highly compressed state in the first cylinder, at that time when its crank has passed the dead top center; third, to utilize part of the force of the explosion in said first cylinder through the medium of said passage to actually increase the fuel compression in the second cylinder during the latter part of the piston compression stroke and during the initial portion of the power stroke in that cylinder; and lastly, to utilize the flame from the first cylinder through the medium of said passage to ignite the fuel in the second cylinder at the time of its highest compression and shortly after its crank has passed the dead top center and permitting the energy of the second explosion to act on the pistons of both cylinders to complete the working stroke with the best leverage of the cranks and highest degree of effect.

This invention may be applied to any form or style of engine and may be applied to those engines having cylinders and pistons rotating around an axis, as well as those wherein the cylinders are stationary.

In the accompanying drawing one embodiment of the invention is illustrated and,

Figure 1 is a sectional view along line 1—1 of Figure 2,

Figure 2 is a sectional view along line 2—2 of Figure 1,

Figure 3 is a side view on a smaller scale, seen from the left of Figure 1, and with the gear cover plate removed.

Figure 4 is a top plan view of Figure 1,

Figure 5 is a view showing the cylinder head with the cylinder block removed.

Figure 6 is a fragmentary sectional view along line 6—6 of Figure 4,

Figure 7 is a diagrammatic view showing the relative positions of the cranks at the time of ignition in the small cylinder, and Figure 8 is a view similar to Figure 7, showing the position of the cranks at the time of ignition of the charge in the large cylinder.

In the drawing, the reference numeral 10 indicates the crank case upon which is rigidly secured the cylinder block 11, by means of bolts 12 or the like, this block containing a small cylinder 13 and a large cylinder 14, both opening into the crank case at the bottom but covered by means of a cylinder head 15 at their upper ends. This cylinder head is rigidly secured to the cylinder block in the usual manner to provide the two compression chambers 16 which are connected by a bypass passage 21 formed in the under face of the head 15 and providing constant communication between the two compression chambers. The usual water space O surrounds the cylinders for the purpose of cooling the cylinders.

In the small cylinder 13, there is a piston 20, having a wrist pin L for the pitman 27 connecting it with the crank 17 of the crank shaft 19. Similarly, the large cylinder has a piston 22 provided with a pitman 27 connecting it with the crank 18, also rigidly mounted on the crank shaft 19.

The latter is carried in bearings 29 provided in the crank case 10, and a flywheel 30 is rigidly secured at one end of the crank shaft outside of the casing 10. Secured to the other end of the crank shaft is a pinion 31 meshing with a gear 32 mounted upon a cam shaft 33 revolubly mounted in the crank case, the latter being provided with a cover plate 34 for the chamber 35, in which the gear train 31—32 is disposed.

The cam shaft 33 is provided with a plurality of small cams or knockers 36 and guided in the crank case are tappets 37, one for each cam 36. These tappets are mounted vertically in the casing and rest their feet on the cam shaft so as to be lifted by their respective cams 36.

The tappets 37 are hollow and each tappet is threaded to receive a shank 38 adjustably carried therein by means of an adjusting nut 39, see Fig. 6. The shank has a cup 40 at its upper end engaging a ball 41 formed on the lower end of a valve operating rod 42. For a two-cylinder unit, as shown in the drawing, three of these cams, tappets, and operating rods are provided, the central rod 42 connecting at its upper end with a short lever 43 fulcrumed in the usual manner, as at 44, and carrying at its other end, an intake valve 45, which opens into the passage 21 about midway between the two cylinders. This intake valve 45 is slidably carried in the cylinder head 15 and is closed in the usual manner by a compression spring 46. The other two operating rods 42 connect with levers 47, each of which is fulcrumed as at 49 and carries at its inner end an exhaust valve, these valves being centrally located as regards the respective cylinders 13 and 14, as best seen in Figures 1 and 4, and guided in the cylinder head 15. These exhaust valves are closed in the usual manner by compression springs 50; the exhaust valves close and open simultaneously. At 51 is shown a spark plug threaded into the cylinder head 15 and situated to one side thereof so as to open into the combustion chamber 16 of small cylinder 13.

The spark plug is preferably situated away from the entrance to the passage 21 and on a central line connecting the two cylinders, as seen in Figures 1 and 4.

The passage 21 shown in detail in Figure 5, is of such a length that the time required for the ignition from the small cylinder to reach the large cylinder will be sufficient to allow the piston in the large cylinder 14 to finish its compression stroke and start on its power stroke.

The approximate length of the passage is about four times the length the small piston travels, from the time ignition takes place in the small cylinder until the flame from the small cylinder should reach the large cylinder.

By the provision of the passage 21 connecting the combustion or compression chambers 16 and 16 of two cylinders, a constant communication between the combustion chambers is provided and accordingly these combustion chambers communicate all the time during the intake, compression, firing and exhaust strokes of the pistons 20 and 22.

Referring to Figures 7 and 8 it will be noted that the crank arms 17 and 18 of the crank shaft 19 are spaced apart at an angle of about 47 degrees; this exact angle is not essential and any other suitable angle may be selected as occasion may require. Figures 7 and 8 show the relative positions of the crank arms, at the time of ignition in the smaller cylinders respectively. In Figure 7, it will be seen that the crank 17 has passed the dead center line or the end of the compression stroke of the small piston 20 and traveled to an angle of approximately 33 degrees, while the crank 18 of the larger piston 22 is still on its compression stroke and approximately 14 degrees back of the dead center line. Under ordinary circumstances, or in engines of usual construction, the combustible fuel in the small cylinder would now have commenced to expand, but on account of the compression still taking place in the large cylinder 14 and because of its greater volume, the compression in the large cylinder will be communicated through the passage 21 to the small cylinder, so that the fuel in the small cylinder will reach its highest point of compression when the crank 17 of piston 20 has moved downward on its power stroke about 33 degrees.

The spark plug situated above the combustion chamber 16 of the small cylinder, is timed to ignite at this very moment, so that the force of the explosion will tend to send the small piston 20 downward on its power stroke, but as the passage 21 is open, a portion of the force of the explosion will be communicated through the passage into the large combustion chamber where the combustible fuel has already been compressed.

As a consequence, the fuel in the large combustion chamber will now be still further compressed by the pressure from the resulting explosion in the small cylinder, while the two cranks continue to turn. On account of the length of the passage 21, the flame from the ignition in the small combustion chamber 16 will not immediately reach the large combustion chamber 16 and by the time the flame has burned through the passage 21, the crank 18 will have finished its compression stroke and passed about 14 degrees to the other side of the dead center line, on its power stroke.

When the crank 18 as shown in Figure 8, has traveled about 14 degrees beyond the dead center line and, as a consequence, is on its power stroke, and the crank 17 has traveled about 61 degrees on its power stroke, the flame will have burned through the passage 21 and at this moment ignites the combustible fuel in the large combustion chamber.

Part of the force of the explosion in the small cylinder which was communicated through the passage into the large cylinder for further compressing the fuel therein, will now be returned from three to five times its original pressure when the explosion takes place in the large cylinder; it is a well known fact that upon the combustion of the fuel in an inclosed chamber the pressure therein increases from three to five times what it was before explosion (depending somewhat upon the mixture and rapidity of combustion). As both pistons are now on their power strokes the force of the explosion will act at the most advantageous position of the cranks, for communicating the rotating force to the crank shaft 19.

In my improved construction of internal combustion engine, as described above, the maximum mechanical effect is produced by utilizing part of the pressure from an ignited fuel charge in a small cylinder to increase the pressure in a larger cylinder prior to ignition therein and bringing about the explosion of the fuel charge in each cylinder at the point of maximum compression. And second, by causing such explosion to take place at times when the cranks are at the most favorable angular position with relation to the axis of the crank shaft, part of the force of the explosion in the small cylinder, above mentioned, which was communicated through the passage into the large cylinder for further increasing the fuel pressure therein, will now be returned from three to five times its original pressure when the explosion takes place in the large cylinder, and at more advantageous position of the cranks.

It will thus be apparent, that a practical and efficient engine construction has been devised for carrying out the desired objects of this invention.

By coupling together several units of the character described above, each having a pair of cylinders, one large and one small, in operative relation to a single crank shaft, an engine of any desired size may be constructed and the same found to work smoothly and with extreme efficiency, as has been proven by tests.

This is capable of developing considerably more power, than any engine of the same size of the usual type of construction which does not utilize part of an ignited fuel charge in one cylinder to obtain the higher compression, raise the temperature and more completely vaporize the fuel charge in another cylinder prior to ignition therein, through the medium of inter-communicating combustion chambers.

It may also be stated that, while I have shown two cylinders forming a unit, three or more cylinders may be combined to form such a unit, the position of the fuel charge in one or several of them operating to hold and increase the compression of the fuel charge in the remaining cylinders during the movement of their respective crank arms past dead top center and with the consequent advantageous features as above explained.

It is broadly new to provide a combustion engine in which part of the pressure of an ignited fuel charge in one or more cylinders is utilized to increase the pressure, raise the temperature and more completely vaporize the fuel charge prior to ignition in one or more cylinders of the engine in the way herein described.

It is also believed to be new to arrange cylinders of different capacity in such a relation that, while the piston of a small cylinder has started on its power stroke, the piston of a large cylinder is still on its compressing stroke and operating to increase the degree of the compression within the small cylinder during the first part of the power stroke of the latter, then ignite the fuel in this highly compressed state in the small cylinder and utilize part of the pressure of the resulting explosion in the small cylinder to not only retain but actually increase the fuel compression in the large cylinder during the latter part of its compression stroke and also during the first part of the power stroke, and causing the ignited fuel charge in the small cylinder to ignite the fuel charge in the large cylinder during the power stroke of both cylinders.

While the engine described and shown in the accompanying drawings constitutes one form of the invention, the right is reserved to make all such changes and modifications as may fairly and properly fall within the scope of the appended claims.

I claim—

1. In an internal combustion engine, the combination of a pair of cylinders of different capacity, each having its own separate combustion chamber, each chamber being provided with a fuel inlet port, said chambers being connected by a constantly open passage, pistons operating in said cylinders, a crank shaft having crank arms separately connected with said pistons, and means for igniting the charge in the combustion chamber of the smaller of said cylinders, the length of said passage and relative arrangement of said crank arms being such that, when operating at normal speed, both arms will move past top dead center prior to the ignition of the charge in the combustion chamber of the larger cylinder.

2. An internal combustion engine comprising a cylinder block having a pair of cylinder bores fitted with pistons, and a cylinder head formed with recesses providing separate combustion chambers at the ends of said cylinder bores, each of said chambers having a separate fuel inlet port, said cylinder head being formed with a passage providing constant communication between said combustion chambers, whereby the fuel-compressing and exploding actions in said combustion chambers may mutually influence each other through the medium of said passage.

3. In an internal combustion engine, a pair of cylinders each having its own separate combustion chamber provided with a separate fuel inlet port, said chambers being connected by a constantly open passage, and ignition means connected with one of said chambers and acting to ignite the charge therein at the time of its maximum fuel compression, said passage being of sufficient length to delay the ignition in the other combustion chamber until the charge therein under normal operating conditions is compressed to a degree in excess of its normal piston compression in response to the explosive action in said first chamber.

4. In an internal combustion engine, a pair of cylinders of different capacity, each having its own separate combustion chamber provided with a fuel inlet port, said chambers being connected by a constantly open passage, pistons working in said cylinders and so timed that the smaller piston is starting on its working stroke as the larger piston is completing its compression stroke, whereby the normal compression in the combustion chamber of the smaller cylinder is increased in response to the compression stroke of the larger piston, and ignition means associated with the combustion chamber of the smaller cylinder, said passage being of sufficient length to delay the ignition in said larger cylinder until after its piston has begun its working stroke.

5. An internal combustion engine, having a plurality of cylinders of different capacity, each having a combustion chamber with a separate fuel inlet port, a constantly open passage connecting said combustion chambers, pistons working in said cylinders, a shaft with an individual crank arm for each piston, positive connection between each piston and its crank arm, said arms being angularly disposed with relation to each other, whereby part of the fuel compression action by the piston in the large cylinder is communicated to the small cylinder through the medium of said passage to increase the fuel compression during the initial portion of the power stroke of the small cylinder, and means for igniting the fuel in the small cylinder at the time of its highest compression, then utilizing part of the expanding action of the ignited fuel in the small cylinder through the medium of said passage to further increase the fuel compression in the large cylinder during the latter part of the piston compression stroke, and also during the initial portion of its power stroke, and prior to ignition in the large cylinder.

6. An internal combustion engine, having a plurality of cylinders of different capacity, each having a combustion chamber with a separate fuel inlet port, a constantly open passage connecting said combustion chambers, pistons working in said cylinders, a crank shaft with an individual crank arm for each piston, positive connection between each piston and its crank arm, said crank arms being angularly disposed with relation to each other, whereby when the smaller piston is proceeding on its power stroke, the larger piston is yet on its compression stroke fuel is being compressed in the smaller cylinder as actuated by the compression in the larger cylinder through the medium of said passage, ignition takes place in the smaller cylinder and communicates an igniting flame there-from through the medium of said passage to the larger cylinder for firing the fuel charge therein after the large piston has begun its working stroke.

7. In an internal combustion engine, the combination of a pair of cylinders of different capacity connected to each other by a constantly open passage, pistons in the respective cylinders, means for reciprocating said pistons so that the smaller piston moves in advance of the larger piston, separate means for supplying fuel to each cylinder, and means for igniting the fuel in the smaller cylinder and thereby subsequently igniting the fuel in the larger cylinder.

8. In an internal combustion engine, the combination of a pair of cylinders having separate combustion chambers connected to each other by a constantly open passage, pistons operating in said cylinders, one in advance of the other, means for admitting fuel to each of said chambers, means for igniting the fuel in the chamber of the cylinder whose piston is farthest advanced after said piston has passed dead center position and before the piston in the other cylinder has reached dead center position, said passage being of such length that when the engine is operating at normal speed the flame reaches the combustion chamber of the second cylinder after the piston of the latter has passed its dead center position.

LEO LAGALI.